(No Model.)
M. L. SMITH.
Wheel Hub.
No. 241,567. Patented May 17, 1881.
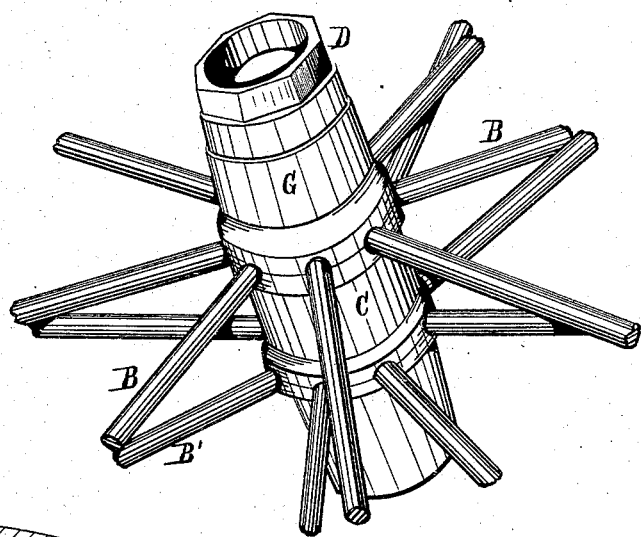
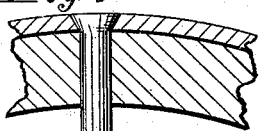
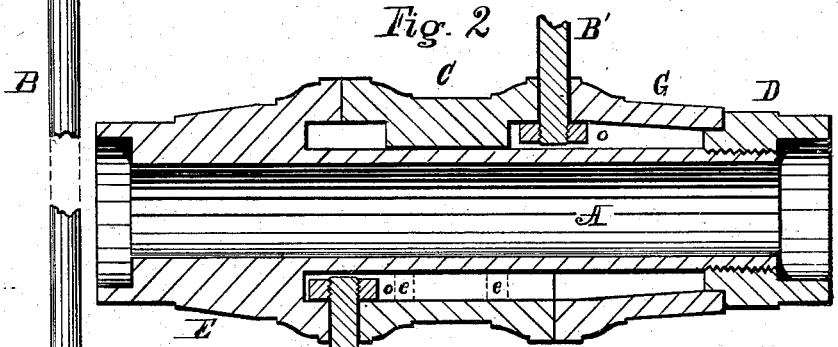
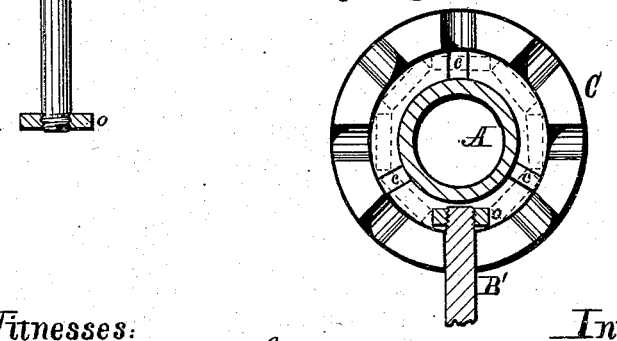
Witnesses:
W. M. Rebasz, Jr.
A. R. Selden.
Inventor:
Melvin L. Smith,
by G. B. Selden,
atty.

UNITED STATES PATENT OFFICE.

MELVIN L. SMITH, OF BATAVIA, NEW YORK, ASSIGNOR, BY DIRECT AND MESNE ASSIGNMENTS, TO HENRY N. BANCROFT, OF JEFFERSON, OHIO, AND CHAS. D. SMITH, HENRY EASTON, AND CHARLES F. HUBER, OF BATAVIA, NEW YORK.

WHEEL-HUB.

SPECIFICATION forming part of Letters Patent No. 241,567, dated May 17, 1881.

Application filed September 10, 1880. (No model.)

*To all whom it may concern:*

Be it known that I, MELVIN L. SMITH, of Batavia, in the county of Genesee and State of New York, have invented an Improved Wheel-Hub, of which the following is a specification, reference being had to the annexed drawings, in which—

Figure 1 is a perspective view of my improved wheel-hub. Fig. 2 is a longitudinal central section of the same. Fig. 3 is a transverse section through the row of spokes B', showing the parts to the left hand of that line. Fig. 4 is a sectional view, showing the mode of attaching the spokes to the felly.

My invention relates to an improvement on Patent No. 56,315; and it consists in an improved construction of the invention therein shown, as hereinafter more fully set forth, having for its object the production of a more durable wheel-hub, of neater appearance, and capable of being repaired more readily.

In the above invention the inner ends of the spokes were inserted into holes bored in the central collar, and being necessarily made slightly smaller than these holes, so that they could readily be introduced therein, there was no close-fitting joint between the spokes and the internal surfaces of the holes, and consequently the jar or vibration produced by the use of the wheel soon wore away the metal and caused the spokes to become so loose that they would rattle in the hub.

In the above invention there was no way of remedying this difficulty, except by boring out the holes and inserting larger spokes.

In the wheel-hubs constructed in accordance with the present invention I obviate this difficulty by drilling the holes for the reception of the inner ends of the spokes in the joints between the central collar and the rings or caps on each side thereof a trifle smaller than the spokes, so that when the caps are screwed together against the collar by a thread and nut on the axle-box the spokes will be firmly clamped in place by the friction between their exterior and the internal surfaces of the holes, so as to form a close-fitting joint and prevent rattling. This method of fastening the spokes in the wheel-hub is sufficient for ordinary purposes; but for further security against the accidental displacement of the spokes I also employ nuts on their inner ends, inside the central collar.

In the before-mentioned invention provision was made for centering the central collar on the axle-box by making its ends of the form of a hollow cone and forcing the conical ends of the outer caps or rings into these cones.

In my present construction I center the collar by providing it on its inner surface with radial ribs or projections, which are bored out to fit the axle-box and secure the correct position for the central section, thereby securing lightness combined with strength. I also make the nuts on the inner ends of the spokes of such a size that they fit against each other, and thereby prevent their turning when the spokes are screwed into them.

My improved wheel-hub is represented in the accompanying drawings, in which A, Fig. 2, is the central sleeve or box, which extends continuously from one end of the hub to the other, and is fitted to revolve on the axle.

B and B' are the two rows of spokes, C the removable collar placed between the rows of spokes, and D the nut on the end of the axle-box, by which the structure is held together.

The axle-box is provided at its inner end with a cap or enlargement, E, and its outer end is screw-threaded to receive the nut D. Around the middle of the axle-box is placed the collar C, which is supported on the axle-box by the radial ribs *c c c*, Fig. 3, projecting from the inside of the collar, or by one or more flanges, shown by dotted lines *e e*, Fig. 2. Between the collar and the nut D the ring or cap G is interposed, the outer edge of which fits over a shoulder formed on the nut D. The two rows of spokes, which are made of round metallic rods, are inserted in equidistant holes bored in the joints between the collar C and the enlargement E and the ring G, and are held in position by the friction between the spokes and the internal surfaces of these holes. The holes are bored in the joints, so that one-half of each hole is formed in the side of the collar and the other half in the opposing side of the cap. The holes are of a diameter slightly smaller than the spokes, so that when the spokes are inserted in the holes and the caps screwed up against the collar the spokes are clamped in the holes by the pressure coming upon them before the opposing surfaces of the joints come in contact. The nut D forces the ring and the collar against the enlargement of the axle-box, so as to secure the spokes firmly in place.

In order to prevent the possibility of the removal of the spokes from accident or otherwise, I attach nuts o o to their inner ends, which nuts are slightly rounded on their outer surfaces to fit the shape of the interior of the collar. The nuts rest against each other, and are thereby prevented from turning around when the spokes are screwed into them. The enlargement E on the axle-box is provided with a groove, which receives the edges of the nuts on the row of spokes B.

In Fig. 4 I have represented the mode of attaching the wooden felly and tire to the outer ends of the spokes. The end of the spoke is upset or otherwise formed into a cone-shaped enlargement, which fits into a corresponding hole in the tire.

My improved wheel-hub presents a neat and tasteful appearance, is simple in construction, can be manufactured cheaply, and is very durable.

In case of accident or injury to any of the spokes the injured ones may be readily removed and others substituted in their places.

I hereby especially disclaim anything shown or specified in the patent of Rowe, No. 4,946, January 26, 1847, the central collar in said invention being centered on the outside sections or caps by flanged joints, and the whole structure being secured together by four bolts, without an axle-box continuous, from end to end of the wheel-hub—a construction which is essentially different from that herein shown. I also disclaim the patent of Woodward and Smith, No. 56,315, July 10, 1866.

I claim—

1. The combination of the continuous axle-box A, having cap E at one end, integral therewith, double row of spokes B B B' B', removable collar C, centered on the axle-box, cap G, and nut D, when the inner ends of the spokes are clamped by friction in holes in the joints between the caps and the collar, and provided inside the collar with the nuts o o, substantially as and for the purposes set forth.

2. The combination of the axle-box A, having enlargement E, collar C, ring G, nut D, and spokes B B B' B', provided on their inner ends with nuts o o, fitted against each other so as to prevent their turning, substantially as and for the purposes described.

MELVIN L. SMITH.

Witnesses:
ELIAS SAFFORD,
ANDREW J. LYON.